(12) United States Patent
Xu et al.

(10) Patent No.: US 10,785,655 B2
(45) Date of Patent: Sep. 22, 2020

(54) TELECOMMUNICATION NETWORK UTILIZING NETWORK SLICE INFORMATION

(71) Applicant: Huawei Technologies Co., Ltd., Shenzhen (CN)

(72) Inventors: Ruiyue Xu, Shanghai (CN); Li Ji, Berkshire (GB); Lan Zou, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,224

(22) Filed: May 1, 2019

(65) Prior Publication Data

US 2019/0261184 A1   Aug. 22, 2019

Related U.S. Application Data

(63) Continuation of application No. PCT/CN2017/108969, filed on Nov. 1, 2017.

(30) Foreign Application Priority Data

Nov. 3, 2016 (CN) .......................... 2016 1 0974442
Jan. 4, 2017 (CN) .......................... 2017 1 0005353

(51) Int. Cl.
*H04W 16/00* (2009.01)
*H04W 16/02* (2009.01)
(Continued)

(52) U.S. Cl.
CPC ......... *H04W 16/02* (2013.01); *H04L 41/0893* (2013.01); *H04L 41/0896* (2013.01);
(Continued)

(58) Field of Classification Search
CPC ..... H04W 16/02; H04W 48/14; H04W 68/00; H04W 84/00; H04L 41/0893; H04L 41/0896; H04L 67/12; H04L 67/16
See application file for complete search history.

(56) References Cited

U.S. PATENT DOCUMENTS

2011/0149968 A1   6/2011 Kim
2019/0174320 A1* 6/2019 Kodaypak ............. H04W 24/02
(Continued)

FOREIGN PATENT DOCUMENTS

CN   105813195 A   7/2016
CN   106060900 A   10/2016

OTHER PUBLICATIONS

3GPP TR 23.799 V1.1.0, 3rd Generation Partnership Project, Technical Specification Group Services and System Aspects, Study on Architecture for Next Generation System, Oct. 2016, pp. 501, Release 14.
(Continued)

*Primary Examiner* — Pakee Fang
(74) *Attorney, Agent, or Firm* — Slater Matsil, LLP

(57) ABSTRACT

This application provide an information sending method, and a device and a system. The method includes: creating or updating, by a first device, a network slice instance; sending, by the first device, a first message to a second device, where the first message carries first network slice instance information, the first network slice instance information is first information about the created or updated network slice instance, and the first network slice instance information includes an identifier of the network slice instance; and storing or configuring, by the second device, the first network slice instance information. In the solutions, after creating or updating the network slice instance, the first device may send the information about the created or updated network slice instance to the second device, and the
(Continued)

second device may store or configure the information, so as to avoid allocating an improper network slice instance to a terminal.

20 Claims, 12 Drawing Sheets

(51) Int. Cl.
*H04W 48/14* (2009.01)
*H04W 68/00* (2009.01)
*H04W 84/00* (2009.01)
*H04L 29/08* (2006.01)
*H04L 12/24* (2006.01)

(52) U.S. Cl.
CPC .............. *H04L 67/12* (2013.01); *H04L 67/16* (2013.01); *H04W 48/14* (2013.01); *H04W 68/00* (2013.01); *H04W 84/00* (2013.01)

(56) References Cited

U.S. PATENT DOCUMENTS

| | | | |
|---|---|---|---|
| 2019/0327153 A1* | 10/2019 | Wahlqvist | ........... H04L 41/5019 |
| 2019/0356558 A1* | 11/2019 | Han | ......................... H04L 67/16 |
| 2019/0357131 A1* | 11/2019 | Sivavakeesar | .. H04W 36/00835 |
| 2020/0037146 A1* | 1/2020 | Salkintzis | ............. H04W 76/14 |

OTHER PUBLICATIONS

Apple: "A solution of network slice instance selection and association," SA WG2 Meeting #116BIS, S2-165458, Aug. 29-Sep. 2, 2016, pp. 6, Sanya, P. R. China.

China Mobile: "Clarification of Network Slice ID in Solution 1.6," SA WG2 Meeting #117, S2-166669, Oct. 17-21, 2016, pp. 7, Kaohsiung, Taiwan.

3GPP TR 28.801 V0.2.0 (Sep. 2016); 3rd Generation Partnership Project; Technical Specification Group Services and System Aspects; Telecommunication management; Study on management and orchestration of network slicing for next generation network (Release 14), 20 pages.

Apple, "A solution of network slice instance selection and association," SA WG2 Meeting #S2-116BIS, S2-165127, (revision of S2-16mx), Aug. 29-Sep. 2, 2016, Sanya, PR China, 6 pages.

China Mobile, "Clarification of Network Slice ID in Solution 1.6," SA WG2 Meeting #117, S2-165660, (revision of S2-16xxx), Oct. 17 21, 2016, Kaohsiung, Taiwan, 6 pages.

ETRI, "pCR TS 28.525 Add requirements for NS instance lifecycle change notification," 3GPP TSG SA WG5 (Telecom Management), Meeting #108, S5-164235, (revision of S5-164114), Jul. 11-15, 2016, Harbin (China), 4 pages.

Huawei, "Adding management use case of Network Slices with Common and Slice Specific Functions," 3GPP TSG SA WG5 (Telecom Management) Meeting #108, S5-164111, (revision of S5-16xabc), Jul. 11-15, 2016, Harbin (China), 4 pages.

* cited by examiner

TELECOMMUNICATION NETWORK UTILIZING NETWORK SLICE INFORMATION

CROSS-REFERENCE TO RELATED APPLICATIONS

This application is a continuation of International Application No. PCT/CN2017/108969, filed on Nov. 1, 2017, which claims priority to Chinese Patent Application No. 201610974442.5, filed on Nov. 3, 2016 and Chinese Patent Application No. 201710005353.4, filed on Jan. 4, 2017, all of which are hereby incorporated by reference in their entireties.

TECHNICAL FIELD

This application relates to the field of communications technologies, and in particular, to an information sending method, a unit, and a system.

BACKGROUND

During research into a future mobile communications system, a concept of network slice is introduced. A network slice may be understood as an on-demand network. A physical network may be logically divided into a plurality of network slices, and different network slices may be used to carry different services. For example, an electric power company needs to provide a smart meter service, and the service may be implemented by connecting network slices of a series of machine-to-machine (M2M) devices. During practical operation, network slice deployment may be implemented by using a network slice instance.

After a terminal accesses a network, a network-side device needs to allocate a network slice instance to the terminal based on some manually entered network information, to provide a service for the terminal. For example, the network information includes virtual machine information and the like. However, because the network slice instance may be dynamically added, modified, and deleted, it is usually impossible to allocate a proper network slice instance to the terminal based on the foregoing network information.

SUMMARY

Embodiments of this application describe an information sending method, a unit, and a system, so as to avoid allocating an improper network slice instance to a terminal.

According to one aspect, an embodiment of this application provides an information sending method, where the method includes: creating or updating, by a first unit, a network slice instance; sending, by the first unit, a first message to a second unit, where the first message carries first network slice instance information, the first network slice instance information is first information about the created or updated network slice instance, and the first network slice instance information includes an identifier of the network slice instance; and storing or configuring, by the second unit, the first network slice instance information.

In the solution in this embodiment of this application, after creating or updating the network slice instance, the first unit may send the information about the created or updated network slice instance to the second unit, and the second unit may store or configure the information about the network slice instance, so as to avoid allocating an improper network slice instance to a terminal.

The creating a network slice instance may be understood as adding or instantiating the network slice instance.

In a possible design, the first message may be an addition notification message of the network slice instance, a configuration message of the network slice instance, an update notification message of the network slice instance, or a reconfiguration message of the network slice instance. For example, when the first unit creates the network slice instance, the first message may be the addition notification message of the network slice instance or the configuration message of the network slice instance. For another example, when the first unit updates the network slice instance, the first message may be the update notification message of the network slice instance or the reconfiguration message of the network slice instance.

In a possible implementation, the first network slice instance information may further include at least one of the following: a status of the network slice instance, information about a network function instance required by the network slice instance, information about a tenant supported by the network slice instance, or information about a service provided by the network slice instance, where the information about the network function instance includes an identifier of the network function instance and a status of the network function instance. For example, when the first message is the addition notification message of the network slice instance or the configuration message of the network slice instance, the first network slice instance information may be that described above.

In another possible implementation, the first network slice instance information may further include at least one of the following: a status of the updated network slice instance, information about a network function instance required by the updated network slice instance, information about a tenant supported by the updated network slice instance, or information about a service provided by the updated network slice instance, where the information about the network function instance includes an identifier of the network function instance and a status of a network function instance. For example, when the first message is the update notification message of the network slice instance or the reconfiguration message of the network slice instance, the first network slice instance information may be that described above.

In the foregoing two possible implementations, the information about the tenant and/or the information about the service may be used to allocate a target network slice instance meeting a service request to a terminal. Herein, the information about the tenant may be the information about the tenant supported by the network slice instance, or may be the information about the tenant supported by the updated network slice instance; and the information about the service may be the information about the service provided by the network slice instance, or may be the information about the service provided by the updated network slice instance.

In a possible design, the first unit may further send a second message to a third unit, where the second message carries second network slice instance information, the second network slice instance information is second information about the created or updated network slice instance, and the second network slice instance information includes the identifier of the network slice instance. Correspondingly, the third unit may store the second network slice instance information.

The second message may be an addition notification message of the network slice instance, a configuration message of the network slice instance, an update notification message of the network slice instance, or a reconfiguration message of the network slice instance. For example, when the first unit creates the network slice instance, the second message may be the addition notification message of the network slice instance or the configuration message of the network slice instance. For another example, when the first unit updates the network slice instance, the second message may be the update notification message of the network slice instance or the reconfiguration message of the network slice instance.

In a possible implementation, the second network slice instance information may further include the status of the network slice instance and/or the information about the network function instance required by the network slice instance, where the information about the network function instance may include at least one of the following: the identifier of the network function instance, the status of the network function instance, or a type of the network function instance. For example, when the second message is the addition notification message of the network slice instance or the configuration message of the network slice instance, the second network slice instance information may be that described above.

In another possible implementation, the second network slice instance information may further include the status of the updated network slice instance and/or the information about the network function instance required by the updated network slice instance, where the information about the network function instance may include at least one of the following: an identifier of an updated network function instance, a status of an updated network function instance, an identifier of a newly added network function instance, or an identifier of a deleted network function instance. For example, when the second message is the update notification message of the network slice instance or the reconfiguration message of the network slice instance, the second network slice instance information may be that described above.

In a possible design, before the first unit sends the first message to the second unit, the second unit may further send a subscription request to the first unit, where the subscription request is used to subscribe to the first network slice instance information; or the second unit may further send a query request to the first unit, where the query request is used to query the first network slice instance information.

In a possible design, the second unit may further receive the service request from the terminal, and allocate the target network slice instance meeting the service request to the terminal based on the first network slice instance information. For example, the first network slice instance information includes the information about the tenant and/or the information about the service, and the second unit may allocate the target network slice instance to the terminal based on the information about the tenant and/or the information about the service.

In a possible design, the second unit may further send a selection request to the third unit, where the selection request is used to request a network function instance required by the target network slice instance meeting the service request of the terminal. The selection request may carry information about the terminal and the identifier of the network slice instance. In this case, the third unit may select, based on the second network slice instance information, the network function instance required by the target network slice instance.

In a possible design, the first unit may further send a first deletion notification to the second unit, where the first deletion notification is used to instruct the second unit to delete the first network slice instance information. The first deletion notification may carry the identifier of the network slice instance.

In a possible design, the first unit may further send a second deletion notification to the third unit, where the second deletion notification is used to instruct the third unit to delete the second network slice instance information. The second deletion notification may carry the identifier of the network slice instance.

In the solution described in this aspect, the first unit may be an NSOAM, or may be an NSO, NSM, NO, NM, or NFVO; the second unit may be an NSSF, or may be an NF-M/data center; and the third unit may be a common NF/NF repository, or may be an NF-M/data center.

According to another aspect, an embodiment of this application provides an information sending method, where the method includes: creating or updating, by a first unit, a network slice instance; sending, by the first unit, a message to a fourth unit, where the message carries third network slice instance information, the third network slice instance information is third information about the created or updated network slice instance, and the third network slice instance information includes an identifier of the network slice instance; and storing or configuring, by a third unit, the third network slice instance information.

The fourth unit may be an integrated unit for the second unit and the third unit that are described in the solution of the previous aspect. The fourth unit may implement behavior of the second unit and behavior of the third unit in the solution of the previous aspect. In this case, the fourth unit does not need to perform behavior of interaction between the second unit and the third unit; or the second unit and the third unit may be disposed as internal modules of the fourth unit, and interaction between the second unit and the third unit is interaction between different internal modules of the fourth unit.

In some possible designs, the first unit may implement behavior of the first unit in the method designs in the solution of the previous aspect, and the fourth unit may implement behavior of the second unit and behavior of the third unit in the method designs in the solution of the previous aspect. Details are not described herein again.

The third network slice instance information may further include partial or entire content of the first network slice instance information and/or the second network slice instance information in the solution of the previous aspect.

In a possible design, the first unit may further send a deletion notification to the fourth unit, where the deletion notification is used to instruct the fourth unit to delete the third network slice instance information. The deletion notification may carry the identifier of the network slice instance.

In the solution described in this aspect, the first unit may be an NSOAM, or may be an NSO, NSM, NO, NM, or NFVO; and the fourth unit may be a common NF/NSC, or may be an NF-M/data center.

The network slice instance in the foregoing two aspects may include at least a core network (CN) part, a radio access network (RAN) part, and a transport network (TN) part; or the network slice instance in the foregoing two aspects may include any two of a CN part, a RAN part, or a TN part; or the network slice instance in the foregoing two aspects may represent a network slice instance in a CN part, a network slice instance in a RAN part, or a network slice instance in a TN part.

According to still another aspect, an embodiment of this application provides a first unit, where the first unit has functions of implementing behavior of the first unit in the foregoing method designs. The functions may be implemented by hardware, or may be implemented by executing corresponding software by hardware. The hardware or the software includes one or more modules that correspond to the foregoing functions.

In a possible design, the first unit includes a processor, where the processor is configured to support the first unit in performing a corresponding function in the foregoing method. Further, the first unit may further include a communications interface, where the communications interface is configured to support communication between the first unit and a second unit, a third unit, a fourth unit, or another unit. Further, the first unit may further include a memory, where the memory is configured to be coupled to the processor, and stores a program instruction and data that are necessary for the first unit.

According to yet another aspect, an embodiment of this application provides a second unit, where the second unit has functions of implementing behavior of the second unit in the foregoing method designs. The functions may be implemented by hardware, or may be implemented by executing corresponding software by hardware. The hardware or the software includes one or more modules that correspond to the foregoing functions.

In a possible design, the second unit includes a processor, where the processor is configured to support the second unit in performing a corresponding function in the foregoing method. Further, the second unit may further include a communications interface, where the communications interface is configured to support communication between the second unit and a first unit, a third unit, or another unit. Further, the second unit may further include a memory, where the memory is configured to be coupled to the processor, and stores a program instruction and data that are necessary for the second unit.

According to still yet another aspect, an embodiment of this application provides a third unit, where the third unit has functions of implementing behavior of the third unit in the foregoing method designs. The functions may be implemented by hardware, or may be implemented by executing corresponding software by hardware. The hardware or the software includes one or more modules that correspond to the foregoing functions.

In a possible design, the third unit includes a processor, where the processor is configured to support the third unit in performing a corresponding function in the foregoing method. Further, the third unit may further include a communications interface, where the communications interface is configured to support communication between the third unit and a first unit, a second unit, or another unit. Further, the third unit may further include a memory, where the memory is configured to be coupled to the processor, and stores a program instruction and data that are necessary for the third unit.

According to a further aspect, an embodiment of this application provides a fourth unit, where the fourth unit has functions of implementing behavior of the fourth unit in the foregoing method designs. The functions may be implemented by hardware, or may be implemented by executing corresponding software by hardware. The hardware or the software includes one or more modules that correspond to the foregoing functions.

In a possible design, the fourth unit includes a processor, where the processor is configured to support the fourth unit in performing a corresponding function in the foregoing method. Further, the fourth unit may further include a communications interface, where the communications interface is configured to support communication between the fourth unit and a first unit or another unit. Further, the fourth unit may further include a memory, where the memory is configured to be coupled to the processor, and stores a program instruction and data that are necessary for the fourth unit.

According to a still further aspect, an embodiment of this application provides a computer storage medium, configured to store a computer software instruction used by the foregoing first unit, where the computer software instruction includes a program designed to execute the foregoing aspects.

According to a yet further aspect, an embodiment of this application provides a computer storage medium, configured to store a computer software instruction used by the foregoing second unit, where the computer software instruction includes a program designed to execute the foregoing aspects.

According to a still yet further aspect, an embodiment of this application provides a computer storage medium, configured to store a computer software instruction used by the foregoing third unit, where the computer software instruction includes a program designed to execute the foregoing aspects.

According to even yet another aspect, an embodiment of this application provides a computer storage medium, configured to store a computer software instruction used by the foregoing fourth unit, where the computer software instruction includes a program designed to execute the foregoing aspects.

According to still even yet another aspect, an embodiment of this application provides a communications system, where the system includes the first unit, the second unit, and the third unit according to the foregoing aspects; or the system includes the first unit and the fourth unit according to the foregoing aspects.

Compared with the prior art, in the solutions in the embodiments of this application, after creating or updating the network slice instance, the first unit may send the information about the created or updated network slice instance to the second unit, and the second unit may store or configure the information about the network slice instance, so as to avoid allocating an improper network slice instance to the terminal.

DETAILED DESCRIPTION OF ILLUSTRATIVE EMBODIMENTS

The following describes the technical solutions in the embodiments of this application with reference to the accompanying drawings in the embodiments of this application.

A network architecture and a service scenario described in the embodiments of this application are intended to describe the technical solutions in the embodiments of this application more clearly, but are not construed as a limitation to the technical solutions provided in the embodiments of this application. A person of ordinary skill in the art may know that, as the network architecture evolves and a new service scenario emerges, the technical solutions provided in the embodiments of this application are also applicable to a similar technical problem.

Figure 1:
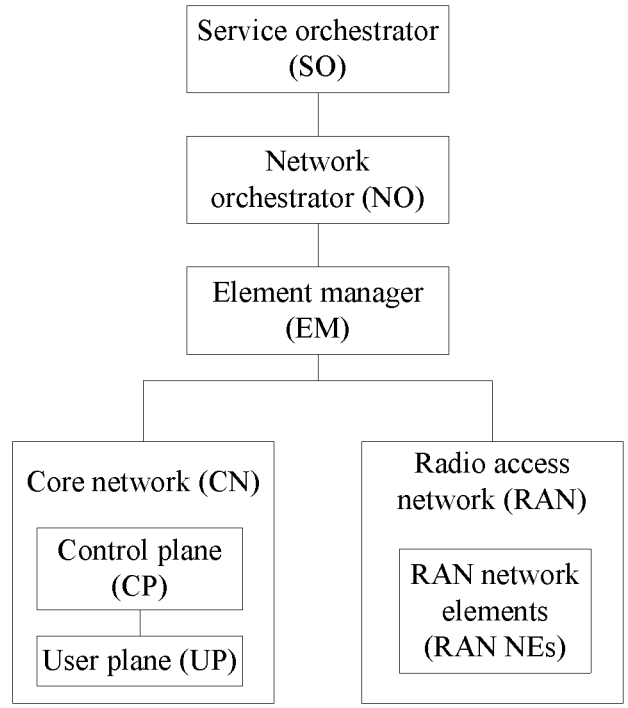
FIG. 1 is a schematic diagram of a possible application scenario according to an embodiment of this application.
Figure 2A:
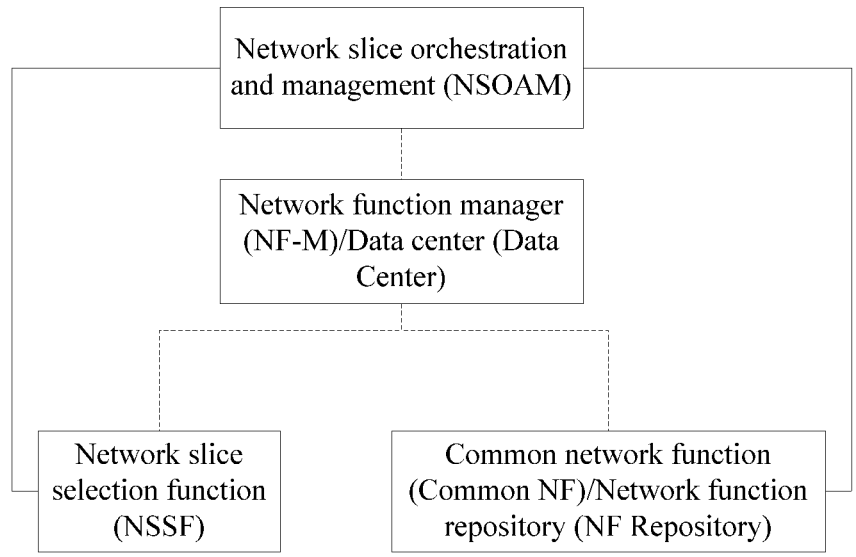
FIG. 2A is a schematic diagram of a possible network architecture according to an embodiment of this application.
Figure 2B:
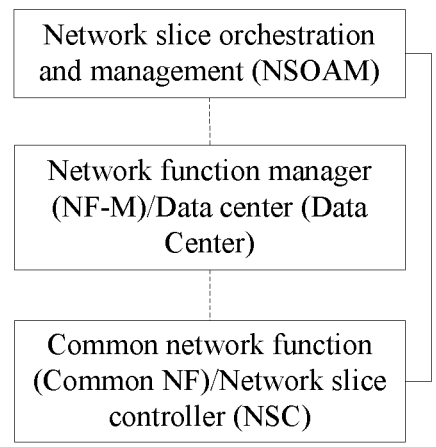
FIG. 2B is a schematic diagram of another possible network architecture according to an embodiment of this application.

With reference to FIG. 1, FIG. 2A, and FIG. 2B, the following first describes some possible application scenarios and network architectures to which the embodiments of this application are applicable.

FIG. 1 is a schematic diagram of a possible application scenario according to an embodiment of this application. The following briefly describes each unit in FIG. 1.

A service orchestrator (SO) unit may also be referred to as a service orchestration and management unit or a service management unit, and mainly has the following functions: life cycle management (for example, instantiation, update, or deletion) of a service based on a service request message; service aggregation; service management, such as fault, configuration, accounting, performance, and security (FCAPS) management of a service; mapping between a service and a network slice; and the like. The service may be a group of communication services, for example, a mobile broadband (MBB) service, a voice service, and an Internet of Things (JOT) service (for example, an intelligent parking service or a smart meter reading service), that are available to a user in a specified service level agreement (SLA). For example, the SO unit may manage a service carried by a network slice.

A network orchestrator (NO) unit mainly has the following functions: network slice management, such as life cycle management of a network slice and management of a network slice template; mapping between a network slice and a network function; coordination between different types of network resources; coordination between network resources provided by different operators and different network providers, to ensure that the network resources provided by the different network providers can meet requirements of a target service, for example, an SLA requirement, a key performance indicator (KPI) requirement, and a quality of service (QoS) requirement; centralized orchestration of network devices provided by different operators; and providing an external application programming interface (API), where the API interface is configured to provide a network function for a third party, to implement inter-operator deployment.

An element manager (EM) unit may also be referred to as a network function manager unit and mainly has the following functions: life cycle management (for example, instantiation, update, or deletion) of a network element or a network function; FCAPS management of a network element or a network function; and the like.

A core network (CN) mainly has the following functions: a control plane (CP) network function (for example, a network slice selection function or a mobility management function) and a user plane (UP) network function (for example, a network function or a charging function of a serving gateway). For example, the CN may include a CP unit and a UP unit, where the CP unit has a CP network function, and the UP unit has a UP network function. Alternatively, the CN may include a common network function (Common NF) unit having a CP network function and/or a UP network function.

A radio access network is referred to as a RAN for short, in which some network elements of the radio access network (RAN Network Element, RAN NE), for example, evolved NodeBs (evolved NodeB, eNodeB or eNB), are mainly deployed. In addition, some RAN network function (RAN NF) entities, for example, eNodeB functions, may further be deployed in the RAN.

The SO unit is connected to the NO unit, the NO unit is further connected to an EM/NF-M unit, and the EM/NF-M is further connected to the CN and the RAN.

It may be understood that the foregoing descriptions of functions of the units are merely some examples, and the units may further have other functions. This is not limited in this embodiment of this application.

Based on the foregoing application scenario, FIG. 2A shows a possible network architecture according to an embodiment of this application. As shown in FIG. 2A, the network architecture may have two different deployment manners.

In a first deployment manner, the network architecture includes a network slice orchestration and management (NSOAM) unit, a network slice selection function (NSSF) unit, and a common NF unit. The NSOAM unit has an interface with each of the NSSF unit and the common NF unit. Connection relationships between these units are shown by solid lines in FIG. 2A.

For ease of description, a unit may be represented below by its English abbreviation. For example, the NSOAM unit may be represented by NSOAM, and the same is true for the other units. Details are not described below.

In a second deployment manner, the network architecture includes an NSOAM, a network function manager (NF-M) unit, an NSSF, and a common NF. There is an interface between the NSOAM and the NF-M, and the NF-M has an interface with each of the NSSF and the common NF. Connection relationships between these units are shown by dashed lines in FIG. 2A. It should be noted that, in this deployment manner, the NSOAM has no interface with both the NSSF and the common NF. The NF-M may be replaced by a data center; or the NF-M may have both a function of the NF-M and a function of a data center. "NF-M/Data center" shown in FIG. 2A represents a unit having the function of the NF-M and/or the function of the data center.

In the foregoing two deployment manners, the common NF unit may be replaced by a network function repository (NF Repository) unit; or the common NF unit may have both a function of the common NF unit and a function of an NF repository unit. "Common NF/NF repository" shown in FIG. 2A represents a unit having the function of the common NF unit and/or the function of the NF repository unit.

The following briefly describes the NSOAM, the NSSF, the common NF, the NF repository, the NF-M, and the data center.

The NSOAM is responsible for life cycle management (for example, creation, deletion, or modification of a network slice), configuration management, fault management, performance management, and the like of a network slice. In the network architecture shown in FIG. 2A, the NSOAM may alternatively be replaced by an independent network slice orchestrator (NSO) unit, an independent network slice manager (NSM) unit, an NO unit, a network manager (NM) unit, or a network functions virtualization orchestrator (NFVO) unit. The NSO is responsible for life cycle management of a network slice (for example, creation, deletion, or modification of a network slice); the NSM is responsible for configuration management, fault management, performance management, and the like of a network slice; the NO is responsible for life cycle management of a network; the NM is responsible for configuration management, fault management, performance management, and the like of a network; the NF-M is responsible for life cycle management, configuration management, fault management, performance management, and the like of a network function; and the NFVO is responsible for life cycle management, configuration management, fault management, performance management, and the like of a network service and a virtualized network function. Optionally, the NSOAM may alternatively be deployed in the NO shown in FIG. 1.

The NSSF is configured to select an available network slice instance for a terminal, and allocate the available network slice instance to the terminal.

The common NF is configured to allocate a network function instance to the terminal. According to the description of the common NF in FIG. 1, the common NF may have the CP network function and/or the UP network function.

The NF repository is configured to store information about the network function instance.

The NF-M is configured to configure or activate the NSSF and the common NF. Optionally, the NF-M may be deployed in the EM shown in FIG. 1.

The data center may also be referred to as a network slice data center, and is a database used to store information about the network slice instance and the information about the network function instance. The NSSF and the common NF may access the data center.

Based on the foregoing application scenario, FIG. 2B shows another possible network architecture according to an embodiment of this application. As shown in FIG. 2B, the network architecture may have two different deployment manners.

In a first deployment manner, the network architecture includes an NSOAM and a common NF, where there is an interface between the NSOAM and the common NF. A connection relationship between these units is shown by a solid line in FIG. 2B.

In a second deployment manner, the network architecture includes an NSOAM, an NF-M, and a common NF. The NF-M has an interface with each of the NSOAM and the common NF. Connection relationships between these units are shown by dashed lines in FIG. 2B. It should be noted that, in this deployment manner, there is no interface between the NSOAM and the common NF.

In the network architecture shown in FIG. 2B, the common NF herein may be a common NF having both a function of the common NF and a function of an NSSF. The common NF may be replaced by a network slice controller (NSC) unit. "Common NF/NSC" shown in FIG. 2B represents a unit having the function of the common NF and/or a function of the NSC.

For descriptions of the NSOAM, the NSSF, the common NF, the NF-M, and a data center in the network architecture shown in FIG. 2B, refer to detailed descriptions in FIG. 2A. The following briefly describes the NSC.

The NSC is configured to activate a network slice instance, allocate the network slice instance to a terminal, and select a network function instance for the terminal.

In the embodiments of this application, the terms "network" and "system" are often used interchangeably, but a person skilled in the art may understand meanings of the terms. The terminal in the embodiments of this application may include various handheld devices, in-vehicle devices, wearable devices, computing devices that have a wireless communication function or another processing device connected to a wireless modem, user equipment (UE) in various forms, a mobile station (MS), a terminal device, and the like. For ease of description, the devices mentioned above are collectively referred to as the terminal.

The network slice instance in the embodiments of this application may include at least a core network (CN) part, a radio access network (RAN) part, and a transport network (TN) part; or the network slice instance in the embodiments of this application may include any two of a CN part, a RAN part, or a TN part; or the network slice instance in the embodiments of this application may represent a network slice instance in a CN part, a network slice instance in a RAN part, or a network slice instance in a TN part. It may be understood that, the network slice instance in the embodiments of this application may have another implementation. This is not limited in the embodiments of this application.

The following further describes the embodiments of this application in detail based on common aspects in the foregoing embodiments of this application.

In an existing solution, after a terminal accesses a network, a network-side device needs to allocate a network slice instance to the terminal based on some manually entered network information, to provide a service for the terminal. For example, the network information includes virtual machine information and the like. However, because the network slice instance may be dynamically added, modified, and deleted, it is usually impossible to allocate a proper network slice instance to the terminal based on the foregoing network information.

In view of this, the embodiments of this application provide an information sending method, and a unit and a system that are based on the method. The method includes: creating or updating, by a first unit, a network slice instance; then sending, by the first unit, a first message to a second unit, where the first message carries first network slice instance information, the first network slice instance information is first information about the created or updated network slice instance, and the first network slice instance information includes an identifier of the network slice instance; and storing or configuring, by the second unit, the first network slice instance information. In the solutions in the embodiments of this application, after creating or updating the network slice instance, the first unit may send the information about the created or updated network slice instance to the second unit, and the second unit may store or configure the information about the network slice instance, so as to avoid allocating an improper network slice instance to a terminal.

It should be noted that, in the foregoing method, an occasion or a condition for sending the first message by the first unit to the second unit is not limited in the embodiments of this application. For example, after creating or updating the network slice instance, the first unit may send the first message to the second unit immediately, or may send the first message to the second unit after a period of time. For another example, the first unit may send the first message to the second unit actively, or may send the first message to the second unit at the request of the second unit or in another case.

Figure 3:
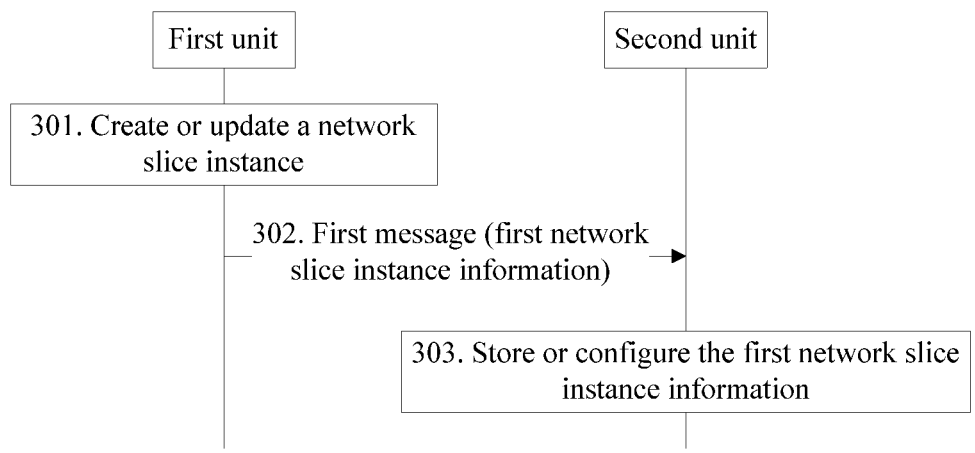
FIG. 3 is a schematic communication diagram of an information sending method according to an embodiment of this application.

The following describes a solution provided in an embodiment of this application with reference to FIG. 3. A method shown in FIG. 3 is described by using an example in which a network architecture to which the method is applied is the network architecture shown in FIG. 2A. The method shown in FIG. 3 includes part 301 to part 303.

In part 301, a first unit creates or updates a network slice instance.

In an example, that a first unit creates a network slice instance may be: adding or instantiating, by the first unit, the network slice instance. For example, the first unit may create a network slice instance through instantiation.

The first unit may be the NSOAM in FIG. 2A, or may be an NSO, an NSM, an NO, an NM, or an NFVO.

In part 302, the first unit sends a first message to a second unit, where the first message carries first network slice instance information, and the first network slice instance information is first information about the created or updated network slice instance.

The first network slice instance information includes an identifier of the network slice instance.

In an example, the first message may be an addition notification message of the network slice instance, a configuration message of the network slice instance, an update notification message of the network slice instance, or a reconfiguration message of the network slice instance. For example, if the first unit creates the network slice instance in pall 301, the first message may be the addition notification message of the network slice instance or the configuration message of the network slice instance; or if the first unit updates the network slice instance in part 301, the first message may be the update notification message of the network slice instance or the reconfiguration message of the network slice instance.

In a possible implementation, when the first message is the addition notification message of the network slice instance or the configuration message of the network slice instance, the first network slice instance information may further include at least one of the following: a status of the network slice instance, a type of the network slice instance, information about a network function instance required by the network slice instance, information about a tenant supported by the network slice instance (for example, an identity of the tenant or a priority of the tenant), or information about a service provided by the network slice instance (for example, a type of the service or an identifier of a service instance), where the information about the network function instance includes an identifier of the network function instance and a status of the network function instance. Alternatively, when the first message is the update notification message of the network slice instance or the reconfiguration message of the network slice instance, the first network slice instance information may further include at least one of the following: a status of the updated network slice instance, information about a network function instance required by the updated network slice instance, information about a tenant supported by the updated network slice instance (for example, an identity of the tenant or a priority of the tenant), or information about a service provided by the updated network slice instance (for example, a type of the service or an identifier of a service instance), where the information about the network function instance includes an identifier of the network function instance and a status of the network function instance.

The status of the network slice instance may include at least one of the following: an active state, an inactive state, an available state, or an unavailable state. Certainly, the status of the network slice instance may further include another form. This is not limited in this embodiment of this application.

The information about the tenant supported by the network slice instance and/or the information about the service provided by the network slice instance may be used to allocate a target network slice instance meeting a service request to a terminal. Alternatively, the information about the tenant supported by the updated network slice instance and/or the information about the service provided by the updated network slice instance may be used to allocate a target network slice instance meeting a service request to a terminal.

In an example, before the first unit sends the first message to the second unit, the second unit may send a subscription request to the first unit, where the subscription request is used to subscribe to the first network slice instance information; or the second unit may send a query request to the first unit, where the query request is used to query the first network slice instance information.

The second unit may be the NSSF in FIG. 2A, or may be the NF-M/data center in FIG. 2A. For example, if the second unit is the NSSF, the first message may be the addition notification message of the network slice instance or the update notification message of the network slice instance; or if the second unit is the NF-M/data center, the first message may be the configuration message of the network slice instance or the reconfiguration message of the network slice instance. When the first message is a message of a different type, refer to detailed descriptions in the foregoing examples, for content that may further be included in the first network slice instance information carried in the first message. Details are not described herein again.

In an example, the first unit may further send a second message to a third unit, where the second message carries second network slice instance information, the second network slice instance information is second information about the created or updated network slice instance, and the second network slice instance information includes the identifier of the network slice instance. It should be noted that the solution in this example may be performed before part 302, or may be performed after part 302; or the solution in this example and part 302 may be concurrently performed. This is not limited in this embodiment of this application.

The third unit may be the common NF/NF repository in FIG. 2A, or may be the NF-M/data center in FIG. 2A.

The second message may be an addition notification message of the network slice instance, a configuration message of the network slice instance, an update notification message of the network slice instance, or a reconfiguration message of the network slice instance. For example, if the first unit creates the network slice instance in part 301, the second message may be the addition notification message of the network slice instance or the configuration message of the network slice instance; or if the first unit updates the network slice instance in part 301, the second message may be the update notification message of the network slice instance or the reconfiguration message of the network slice instance.

In a possible implementation, the second network slice instance information may further include the status of the network slice instance and/or the information about the network function instance required by the network slice instance, where the information about the network function instance includes at least one of the following: the identifier of the network function instance, the status of the network function instance, or a type of the network function instance. For example, if the first unit creates the network slice instance in part 301, the second network slice instance information may further include the foregoing content.

In another possible implementation, the second network slice instance information may further include the status of the updated network slice instance and/or the information about the network function instance required by the updated network slice instance, where the information about the network function instance includes at least one of the following: an identifier of an updated network function instance, a status of an updated network function instance, an identifier of a newly added network function instance, or an identifier of a deleted network function instance. For example, if the first unit updates the network slice instance in part 301, the second network slice instance information may further include the foregoing content.

After receiving the second message from the first unit, the third unit may store the second network slice instance information. Further, the second unit may further activate the network slice instance based on the second network slice instance information.

In an example, the first unit may further send a second deletion notification to the third unit, where the second deletion notification is used to instruct the third unit to delete the second network slice instance information. The second deletion notification may carry the identifier of the network slice instance.

In part 303, the second unit stores or configures the first network slice instance information.

In an example, if the second unit is the NSSF or the data center, the second unit may store the first network slice instance information; or if the second unit is the NF-M, the second unit may configure the first network slice instance information. For example, that the second unit configures the first network slice instance information means that the NF-M configures the first network slice instance information on the NSSF or the data center.

In an example, the second unit may further activate the network slice instance based on the first network slice instance information.

In an example, the second unit may further receive the service request from the terminal, and allocate the target network slice instance meeting the service request to the terminal based on the first network slice instance information. For ease of description, the target network slice instance is described as a target slice instance below. It should be noted that the phrase "network slice instance" that appears below is not the target slice instance. For example, if the second unit is the NSSF, the second unit may receive the service request from the terminal, and allocate the target slice instance to the terminal based on the stored first network slice instance information and the service request. The service request may carry information about the terminal, and the second unit may further be associated with the network slice instance and the terminal. For example, the information about the terminal may include an identifier of the terminal, and the second unit may be associated with the identifier of the network slice instance and the identifier of the terminal.

In another example, the second unit may further provide the first network slice instance information for another unit. For example, if the second unit is the data center, the NSSF may receive the service request from the terminal, query the first network slice instance information from the data center, and then allocate the target slice instance to the terminal based on the first network slice instance information and the service request.

The information about the terminal may include at least one of the following: an identity of a tenant associated with the terminal, a type of a service requested by the terminal, or a type of a network slice instance required by the terminal. The identity of the tenant associated with the terminal may be referred to as a second tenant identity, the type of the service requested by the terminal may be referred to as a second service type, and the type of the network slice instance required by the terminal may be referred to as a second instance type.

In a possible implementation, the first network slice instance information includes at least one of the following: the information about the tenant, the information about the service, the status of the network slice instance, or the type of the network slice instance. The second unit may allocate the target slice instance to the terminal based on at least one of the information about the tenant, the information about the service, the status of the network slice instance, or the type of the network slice instance. It should be noted that if the first unit creates the network slice instance in part 301, the information about the tenant herein is the information about the tenant supported by the network slice instance, and/or the information about the service herein is the information about the service provided by the network slice instance; or if the first unit updates the network slice instance, the information about the tenant herein is the information about the tenant supported by the updated network slice instance, and/or the information about the service herein is the information about the service provided by the updated network slice instance.

The second unit may allocate the target slice instance to the terminal based on at least one of the information about the tenant, the information about the service, the status of the network slice instance, or the type of the network slice instance in one or at least two of the following manners:

Manner 1: The first network slice instance information includes the information about the tenant and the information about the service, where the information about the tenant is a first tenant identity, and the information about the service is a first service type; and an implementation process in which the second unit allocates the target slice instance to the terminal may be one of the following cases.

When the service request of the terminal carries only the second tenant identity, the second unit may search for the first tenant identity that is the same as the second tenant identity, determine a network slice instance corresponding to the first tenant identity as the target slice instance, and allocate the target slice instance to the terminal.

When the service request of the terminal carries only the second service type, the second unit may search for the first service type that is the same as the second service type, determine a network slice instance corresponding to the first service type as the target slice instance, and allocate the target slice instance to the terminal.

When the service request of the terminal carries the second tenant identity and the second service type, the second unit may search for the first tenant identity that is the same as the second tenant identity and the first service type that is the same as the second service type, determine a network slice instance corresponding to the first tenant identity and the first service type as the target slice instance, and allocate the target slice instance to the terminal.

Manner 2: The first network slice instance information includes the status of the network slice instance, and the second unit searches for a network slice instance in an available state based on the service request of the terminal, determines the network slice instance as the target slice instance, and allocates the target slice instance to the terminal.

Manner 3: The first network slice instance information includes the type of the network slice instance, the type of the network slice instance may be referred to as a first instance type, the service request of the terminal carries the second instance type, and the second unit may search for the first instance type that is the same as the second instance type, determine the network slice instance corresponding to the first instance type as the target slice instance, and allocate the target slice instance to the terminal.

It should be noted that, generally, one or at least two network slice instances may be selected in one or at least two of the foregoing three manners. If one network slice instance is selected, the network slice instance is determined as the target slice instance. If at least two network slice instances are selected, one of the at least two network slice instances may further be determined as the target slice instance based on other information. For example, the target slice instance may further be determined based on a type of the terminal, the identifier of the terminal (for example, an international mobile subscriber identity (IMSI) or a temporary mobile subscriber identity (TMSI)), or the like.

In an example, the second unit may further send a selection request to the third unit, where the selection request is used to request a network function instance required by the target slice instance. Optionally, the selection request may carry the information about the terminal and the identifier of the network slice instance, where the information about the terminal may include the identifier of the terminal.

After receiving the selection request from the second unit, the third unit may select, based on the selection request and the second network slice instance information, the network function instance required by the target slice instance.

In an example, the second unit may further receive a first deletion notification from the first unit, where the first deletion notification is used to instruct the second unit to delete the first network slice instance information, and the first deletion notification may carry the identifier of the network slice instance.

Figure 4:
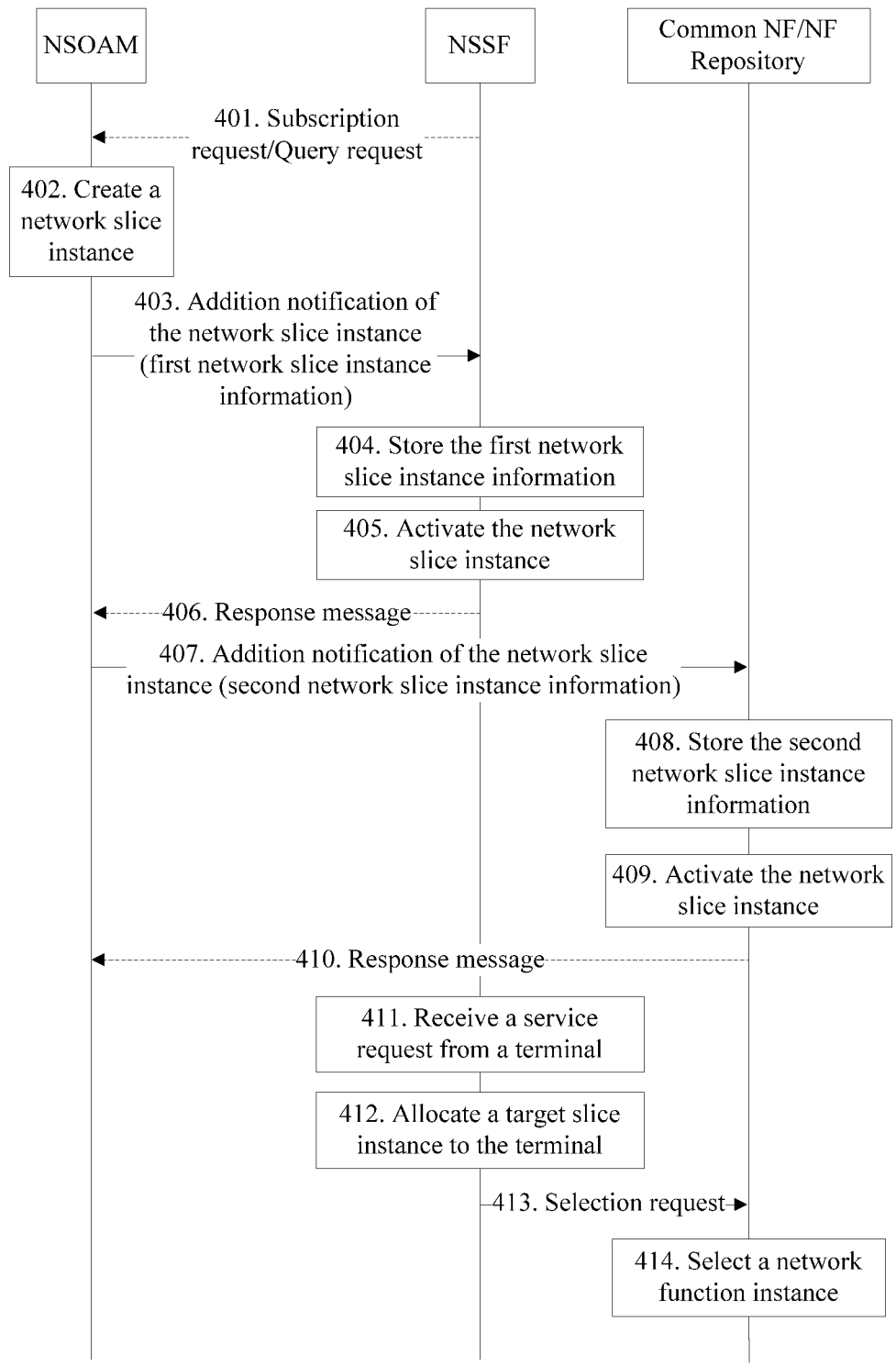
FIG. 4 is a schematic communication diagram of another information sending method according to an embodiment of this application.
Figure 5:
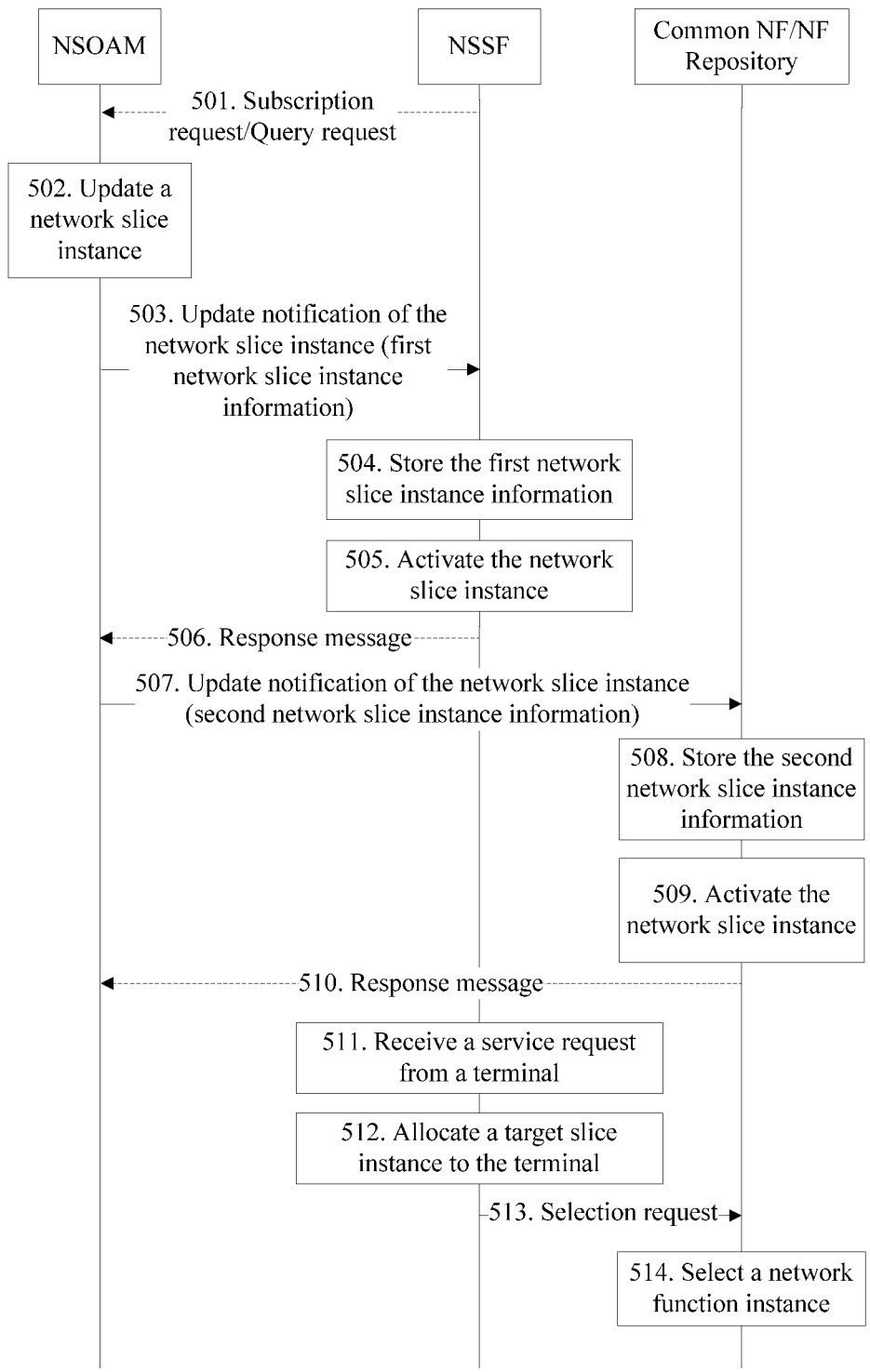
FIG. 5 is a schematic communication diagram of still another information sending method according to an embodiment of this application.
Figure 6:
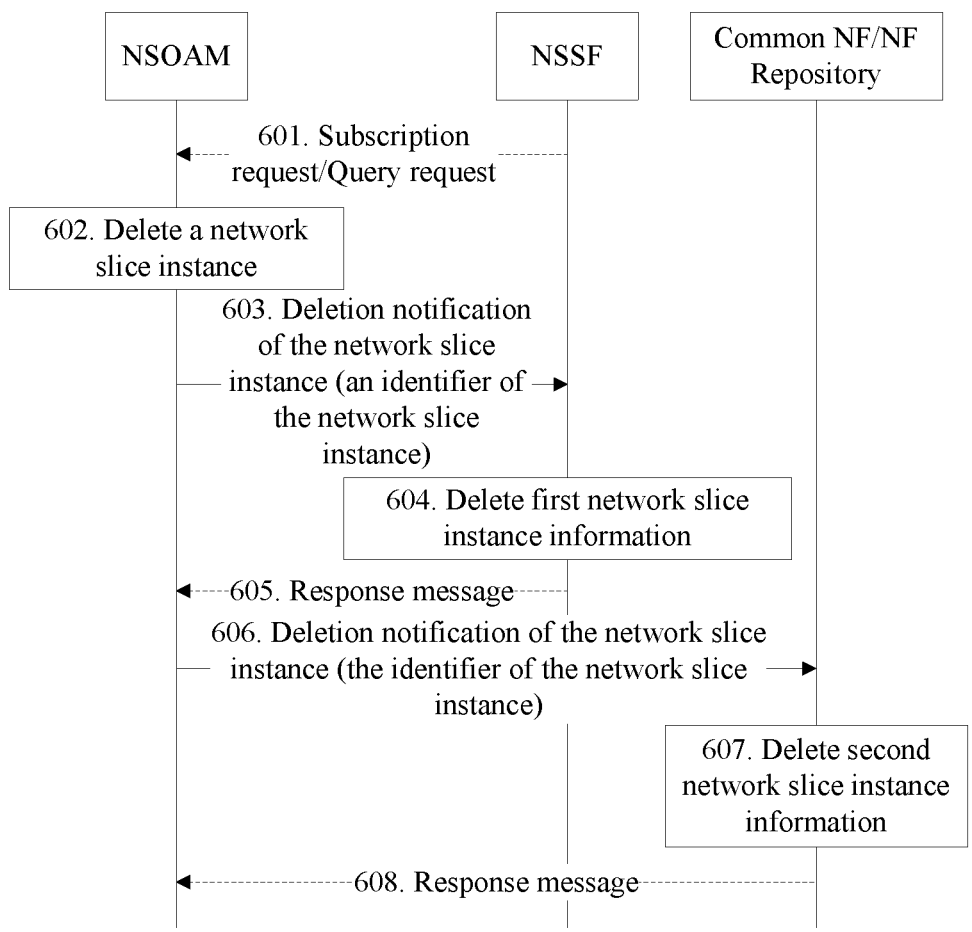
FIG. 6 is a schematic communication diagram of an information deletion method according to an embodiment of this application.

With reference to FIG. 4 to FIG. 6, on the basis of the method shown in FIG. 3, the following further describes solutions provided in embodiments of this application. For content in methods shown in FIG. 4 to FIG. 6 that is the same as or similar to that in the method shown in FIG. 3, refer to detailed descriptions in the embodiment of FIG. 3. Details are not described herein again.

A network architecture to which the methods shown in FIG. 4 to FIG. 6 are applied is the network architecture shown in FIG. 2A. The solutions in the embodiments of this application are described by using an example in which a first unit is an NSOAM, a second unit is an NSSF, and a third unit is a common NF/NF repository.

FIG. 4 shows an information sending method in a network slice instance creation scenario according to an embodiment of this application. The method shown in FIG. 4 includes part 401 to part 414, where part 401, part 406, and part 410 are optional parts.

In part 401, the NSSF sends a subscription request or a query request to the NSOAM.

The subscription request or the query request is used to request first network slice instance information.

In part 402, the NSOAM creates a network slice instance.

It should be noted that a sequence of performing part 401 and part 402 is not limited in this embodiment of this application. For example, part 401 may be performed before part 402; or part 402 may be performed before part 401; or part 401 and part 402 may be concurrently performed.

In part 403, the NSOAM sends an addition notification of the network slice instance to the NSSF, where the addition notification carries the first network slice instance information.

The first network slice instance information is first information about the created network slice instance. For description of the first network slice instance information, refer to detailed descriptions in part 302 of FIG. 3. Details are not described herein again.

In part 404, the NSSF stores the first network slice instance information.

In part 405, the NSSF activates the network slice instance based on the first network slice instance information.

In part 406, the NSSF sends a response message to the NSOAM, to notify the NSOAM that the NSSF has stored the first network slice instance information and activated the network slice instance.

In part 407, the NSOAM sends an addition notification of the network slice instance to the common NF/NF repository, where the addition notification carries second network slice instance information.

The second network slice instance information is second information about the created network slice instance. For description of the second network slice instance information, refer to detailed descriptions in part 302 of FIG. 3. Details are not described herein again.

In part 408, the common NF/NF repository stores the second network slice instance information.

In part 409, the common NF/NF repository activates the network slice instance based on the second network slice instance information.

In part 410, the common NF/NF repository sends a response message to the NSOAM, to notify the NSOAM that the common NF/NF repository has stored the second network slice instance information and activated the network slice instance.

It should be noted that a sequence of performing parts 403 to 406 and parts 407 to 410 is not limited in this embodiment of this application. For example, parts 403 to 406 may be performed before parts 407 to 410; or parts 407 to 410 may be performed before parts 403 to 406; or parts 403 to 406 and parts 407 to 410 may be concurrently performed.

In part 411, the NSSF receives a service request from a terminal.

In an example, the service request may carry information about the terminal. For description of the information about the terminal, refer to detailed descriptions in part 303 of FIG. 3. Details are not described herein again.

It should be noted that if the request sent by the NSSF to the NSOAM in part 401 is the query request, in the method shown in FIG. 4, part 401 and parts 403 to 410 may not be performed before part 411, but may be performed after part 411. To be specific, after receiving the service request from the terminal, the NSSF sends the query request to the NSOAM and performs subsequent steps.

In part 412, the NSSF allocates a target slice instance meeting the service request to the terminal based on the first network slice instance information.

For a specific implementation process of allocating the target slice instance by the NSSF to the terminal, refer to detailed descriptions of allocating the target slice instance by the second unit to the terminal in part 303 of FIG. 3. Details are not described herein again.

In part 413, the NSSF sends a selection request to the common NF/NF repository, where the selection request is used to request a network function instance required by the target slice instance.

In part 414, the common NF/NF repository selects, based on the selection request and the second network slice instance information, the network function instance required by the target slice instance.

It should be noted that, in the method shown in FIG. 4, the NSSF may be replaced by the NF-M. If the NSSF is replaced by the NF-M, the addition notification of the network slice instance in part 403 is replaced by a configuration message of the network slice instance; storing the first network slice instance information in part 404 is replaced by configuring the first network slice instance information; and storing the second network slice instance information in part 408 is replaced by configuring the second network slice instance information. In addition, if the NSSF is replaced by the NF-M, palls 411 to 414 are not performed.

FIG. 5 shows an information sending method in a network slice instance update scenario according to an embodiment of this application. The method shown in FIG. 5 is similar to the method shown in FIG. 4. For content in the method shown in FIG. 5 that is similar to that in the method shown in FIG. 4, refer to detailed descriptions in the embodiment of FIG. 4. Herein, only differences are described, and other content is not described again. Main differences between the method shown in FIG. 5 and the method shown in FIG. 4 are as follows.

The NSOAM updates a network slice instance in part 502, while the NSOAM creates a network slice instance in part 402.

The method shown in FIG. 4 relates to an addition notification of the network slice instance, while the method shown in FIG. 5 relates to an update notification of the network slice instance.

First network slice instance information and second network slice instance information in the method shown in FIG. 4 differ from the first network slice instance information and the second network slice instance information in the method shown in FIG. 5. The former is for the network slice instance creation scenario, while the latter is for the network slice instance update scenario. Specifically, a difference between the pieces of information can be learned from detailed descriptions in part 302 of FIG. 3. Details are not described herein again.

It should be noted that, in the method shown in FIG. 5, the NSSF may be replaced by the NF-M. If the NSSF is replaced by the NF-M, the update notification of the network slice instance in part 503 is replaced by a reconfiguration message of the network slice instance; storing the first network slice instance information in part 504 is replaced by configuring the first network slice instance information; and storing the second network slice instance information in part 508 is replaced by configuring the second network slice instance information. In addition, if the NSSF is replaced by the NF-M, palls 511 to 514 are not performed.

FIG. 6 shows an information deletion method according to an embodiment of this application. The method shown in FIG. 6 may be performed on the basis of the method shown in FIG. 3, FIG. 4, or FIG. 5. The method shown in FIG. 6 includes part 601 to part 608, where part 601, part 605, and part 608 are optional parts.

In part 601, the NSSF sends a subscription request or a query request to the NSOAM.

The subscription request or the query request is used to request information about network slice instance deletion.

In part 602, the NSOAM deletes a network slice instance.

It should be noted that a sequence of performing part 601 and part 602 is not limited in this embodiment of this application. For example, part 601 may be performed before part 602; or part 602 may be performed before part 601; or part 601 and part 602 may be concurrently performed.

In part 603, the NSOAM sends a deletion notification of the network slice instance to the NSSF, where the deletion notification carries an identifier of the network slice instance.

In part 604, the NSSF deletes first network slice instance information based on the identifier of the network slice instance.

The first network slice instance information is first information about a created or updated network slice instance. For description of the first network slice instance information, refer to detailed descriptions in part 302 of FIG. 3. Details are not described herein again.

In part 605, the NSSF sends a response message to the NSOAM, to notify the NSOAM that the NSSF has deleted the first network slice instance information.

In part 606, the NSOAM sends the deletion notification of the network slice instance to the common NF/NF repository, where the deletion notification carries the identifier of the network slice instance.

In part 607, the common NF/NF repository deletes second network slice instance information based on the identifier of the network slice instance.

The second network slice instance information is second information about the created or updated network slice instance. For description of the second network slice instance information, refer to detailed descriptions in part 302 of FIG. 3. Details are not described herein again.

In part 608, the common NF/NF repository sends a response message to the NSOAM, to notify the NSOAM that the common NF/NF repository has deleted the second network slice instance information.

It should be noted that, in the method shown in FIG. 6, the NSSF may be replaced by an NF-M/data center.

The methods shown in FIG. 3 to FIG. 6 are all described by using an example in which a network architecture to which the methods are applied is the network architecture shown in FIG. 2A. It should be noted that the solutions in the embodiments of this application may also be applied to the network architecture shown in FIG. 2B. When the methods shown in FIG. 3 to FIG. 6 are applied to the network architecture shown in FIG. 2B, a function of the second unit and a function of the third unit are implemented by an integrated unit. In this case, interaction between the second unit and the third unit does not need to be performed; or the second unit and the third unit may be disposed as internal modules of the integrated unit, and interaction between the second unit and the third unit is interaction between different internal modules of the integrated unit. The integrated unit may be the common NF/NSC in FIG. 2B. For ease of description, the integrated unit may also be referred to as a fourth unit.

Figure 7:
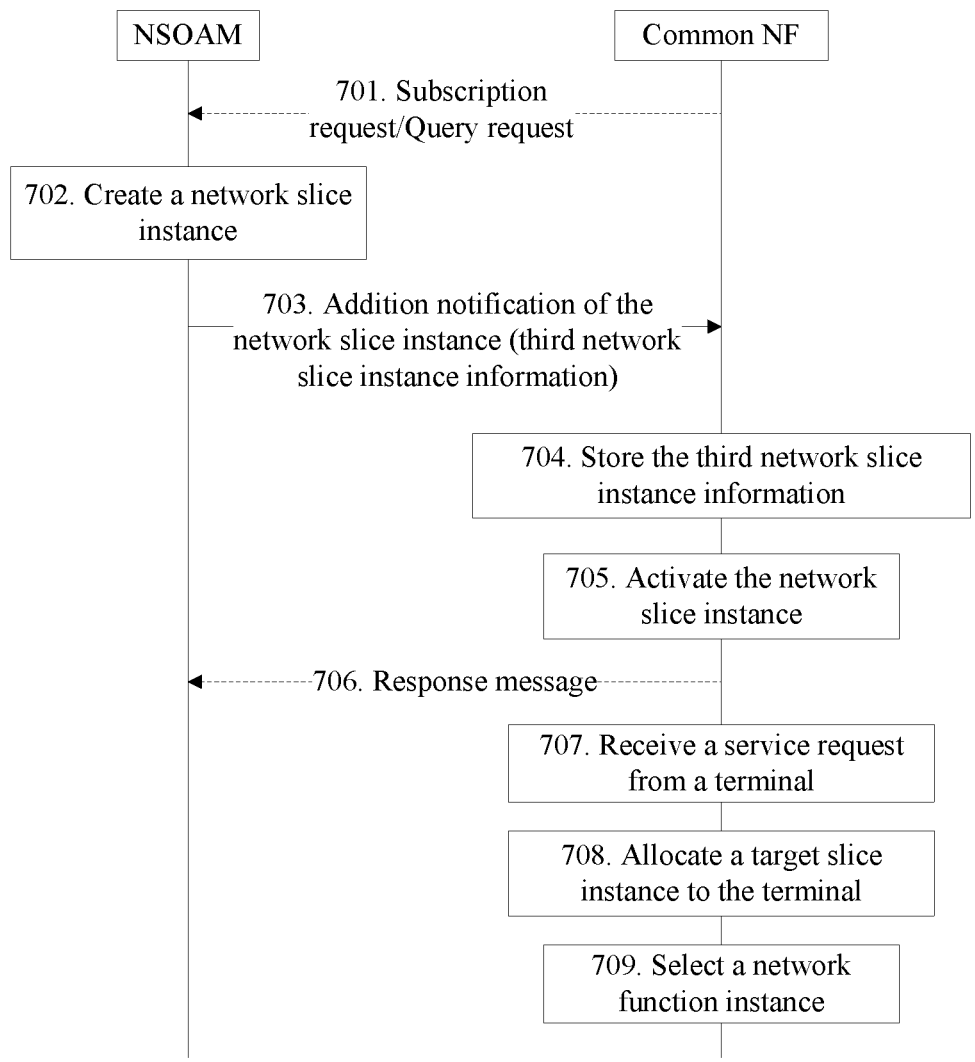
FIG. 7 is a schematic communication diagram of yet another information sending method according to an embodiment of this application.
Figure 8:
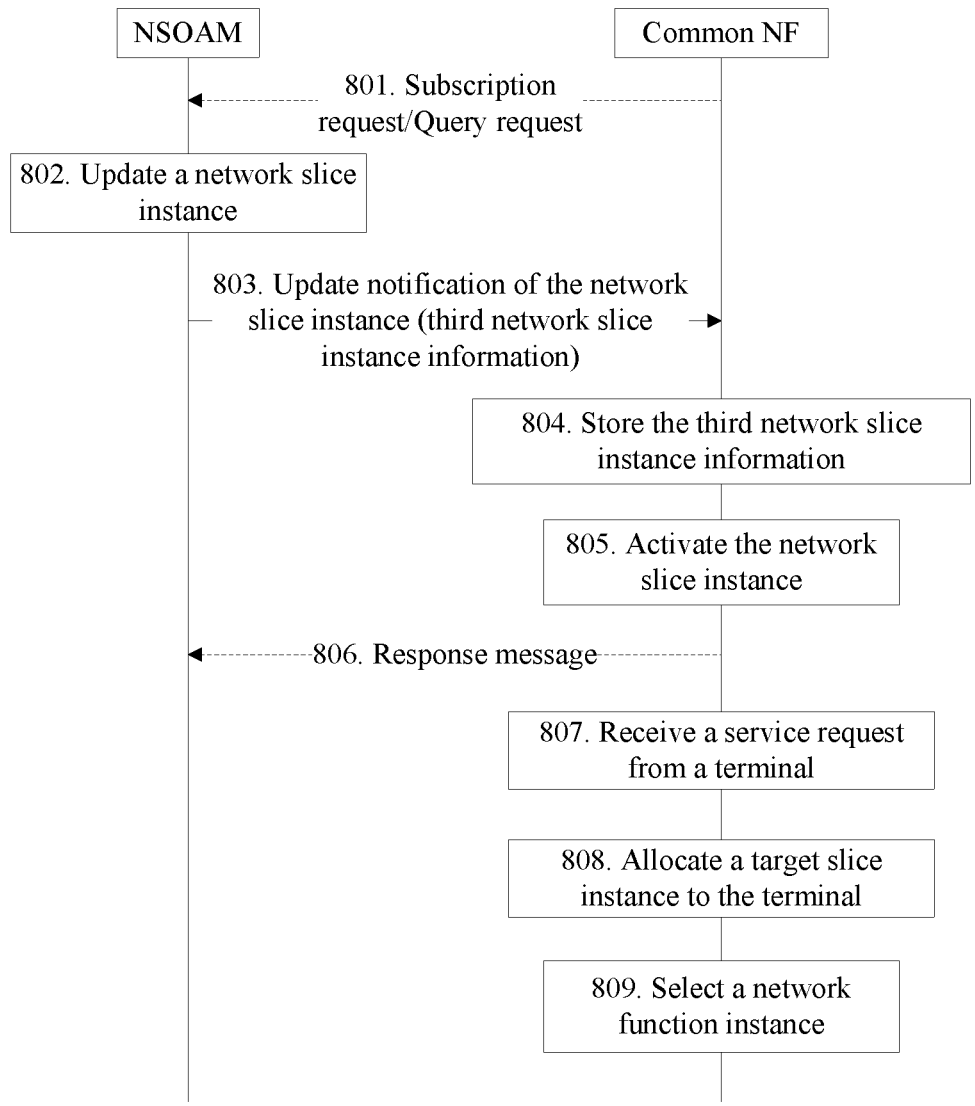
FIG. 8 is a schematic communication diagram of still yet another information sending method according to an embodiment of this application.
Figure 9:
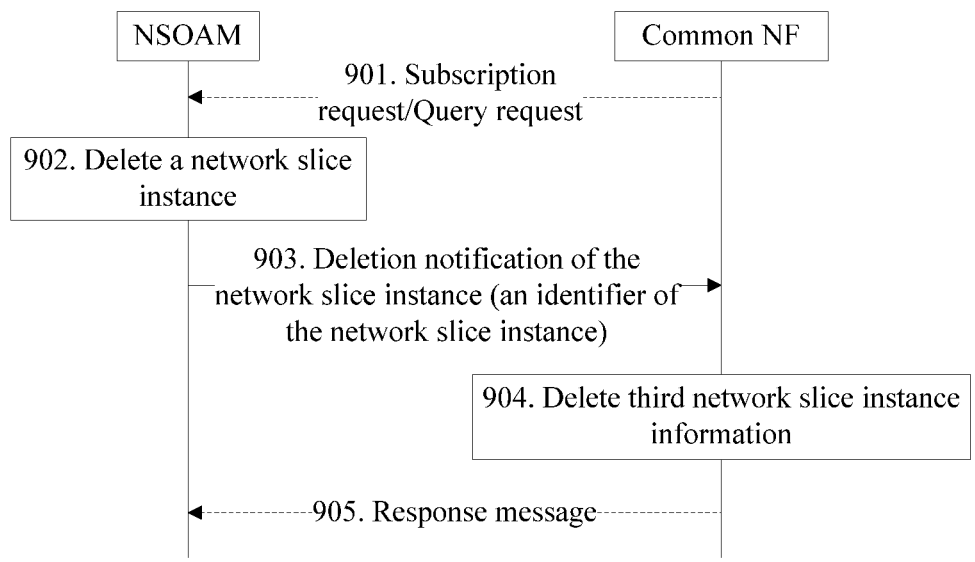
FIG. 9 is a schematic communication diagram of another information deletion method according to an embodiment of this application.

With reference to FIG. 7 to FIG. 9, the following describes, by using an example in which the integrated unit is the common NF, the solutions that are applied to the network architecture shown in FIG. 2B in the embodiments of this application. For content in methods shown in FIG. 7 to FIG. 9 that is similar to that in the methods shown in FIG. 3 to FIG. 6, refer to detailed descriptions in the embodiments of FIG. 3 to FIG. 7. Details are not described herein again.

FIG. 7 shows another information sending method in a network slice instance creation scenario according to an embodiment of this application. The method shown in FIG. 7 includes part 701 to part 709, where part 701 and part 706 are optional parts.

In part 701, the common NF sends a subscription request or a query request to an NSOAM.

The subscription request or the query request is used to request third network slice instance information. The third network slice instance information is third information about a created network slice instance, and the third network slice instance information includes an identifier of the network slice instance. Further, the third network slice instance information may further include partial or entire content of the first network slice instance information and/or the second network slice instance information in the method shown in FIG. 3 or FIG. 4. For specific description, refer to the foregoing descriptions of the first network slice instance information and the second network slice instance information. Details are not described herein again.

In part 702, the NSOAM creates a network slice instance.

It should be noted that a sequence of performing part 701 and part 702 is not limited in this embodiment of this application. For example, part 701 may be performed before part 702; or part 702 may be performed before part 701; or part 701 and part 702 may be concurrently performed.

In part 703, the NSOAM sends an addition notification of the network slice instance to the common NF, where the addition notification carries third network slice instance information.

In part 704, the common NF stores the third network slice instance information.

In part 705, the common NF activates the network slice instance based on the third network slice instance information.

In part 706, the common NF sends a response message to the NSOAM, to notify the NSOAM that the common NF has stored the third network slice instance information and activated the network slice instance.

In part 707, the common NF receives a service request from a terminal.

In an example, the service request may carry information about the terminal. For description of the information about the terminal, refer to detailed descriptions in part 303 of FIG. 3. Details are not described herein again.

It should be noted that if the request sent by the common NF to the NSOAM in part 701 is the query request, in the method shown in FIG. 7, part 701 and parts 703 to 706 may not be performed before part 707, but may be performed after part 707. To be specific, after receiving the service request from the terminal, the common NF sends the query request to the NSOAM and performs subsequent steps.

In part 708, the common NF allocates a target slice instance meeting the service request to the terminal based on the third network slice instance information.

A specific implementation process of allocating the target slice instance by the common NF to the terminal is similar to a specific implementation process of allocating the target slice instance by the NSSF to the terminal in part 412 of FIG. 4, and reference may be made to detailed descriptions in part 412. Details are not described herein again.

In part 709, the common NF selects, based on the third network slice instance information, a network function instance required by the target slice instance.

It should be noted that, in the method shown in FIG. 7, the common NF may be replaced by an NF-M. If the common NF is replaced by the NF-M, the addition notification of the network slice instance in part 703 is replaced by a configuration message of the network slice instance; and storing the third network slice instance information in part 704 is replaced by configuring the third network slice instance information. In addition, if the common NF is replaced by the NF-M, pails 707 to 709 are not performed.

FIG. 8 shows another information sending method in a network slice instance update scenario according to an embodiment of this application. The method shown in FIG. 8 is similar to the method shown in FIG. 7. For content in the method shown in FIG. 8 that is similar to that in the method shown in FIG. 7, refer to detailed descriptions in the embodiment of FIG. 7. Herein, only differences are described, and other content is not described again. Main differences between the method shown in FIG. 8 and the method shown in FIG. 7 are as follows.

The NSOAM updates a network slice instance in part 802, while the NSOAM creates a network slice instance in part 702.

The method shown in FIG. 8 relates to an addition notification of the network slice instance, while the method shown in FIG. 7 relates to an update notification of the network slice instance.

Third network slice instance information in the method shown in FIG. 7 differs from the third network slice instance information in the method shown in FIG. 8. The former is for the network slice instance creation scenario, while the latter is for the network slice instance update scenario. Specifically, a difference between the pieces of information can be learned from detailed descriptions in part 302 of FIG. 3. Details are not described herein again.

It should be noted that, in the method shown in FIG. 8, the common NF may be replaced by an NF-M. If the common NF is replaced by the NF-M, the update notification of the network slice instance in part 803 is replaced by a reconfiguration message of the network slice instance; and storing the third network slice instance information in part 804 is replaced by configuring the third network slice instance information. In addition, if the common NF is replaced by the NF-M, parts 807 to 809 are not performed.

FIG. 9 shows another information deletion method according to an embodiment of this application. The method shown in FIG. 9 may be performed on the basis of the method shown in FIG. 7 or FIG. 8. The method shown in FIG. 9 includes part 901 to part 905, where part 901 and part 905 are optional parts.

In part 901, the common NF sends a subscription request or a query request to the NSOAM.

The subscription request or the query request is used to request information about network slice instance deletion.

In part 902, the NSOAM deletes a network slice instance.

It should be noted that a sequence of performing part 901 and part 902 is not limited in this embodiment of this application. For example, part 901 may be performed before part 902; or part 902 may be performed before part 901; or part 901 and part 902 may be concurrently performed.

In part 903, the NSOAM sends a deletion notification of the network slice instance to the common NF, where the deletion notification carries an identifier of the network slice instance.

In part 904, the common NF deletes third network slice instance information based on the identifier of the network slice instance.

The third network slice instance information is third information about a created or updated network slice instance. For description of the third network slice instance information, refer to detailed descriptions of the third network slice instance information in the method shown in FIG. 7 or FIG. 8. Details are not described herein again.

In part 905, the common NF sends a response message to the NSOAM, to notify the NSOAM that the common NF has deleted the third network slice instance information.

It should be noted that, in the method shown in FIG. 9, the common NF may be replaced by an NF-M/data center.

The foregoing mainly describes the solutions provided in the embodiments of this application from the perspective of interaction between different units. It may be understood that, to implement the foregoing functions, the first unit, the second unit, the third unit, and the integrated unit include corresponding hardware structures and/or software modules for performing the functions. With reference to the example units and algorithm steps described in the embodiments disclosed in this application, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

Division of functional modules may be performed on the first unit, the second unit, the third unit, and the integrated unit based on the foregoing method examples in the embodiments of this application. For example, the functional modules may be divided according to the functions, or two or more functions may be integrated into one processing module. The integrated module may be implemented in a form of hardware, or may be implemented in a form of a software functional module. It should be noted that the division of modules in the embodiments of this application is an example, and is merely logical function division, and there may be another division manner in actual implementation.

Figure 10A:
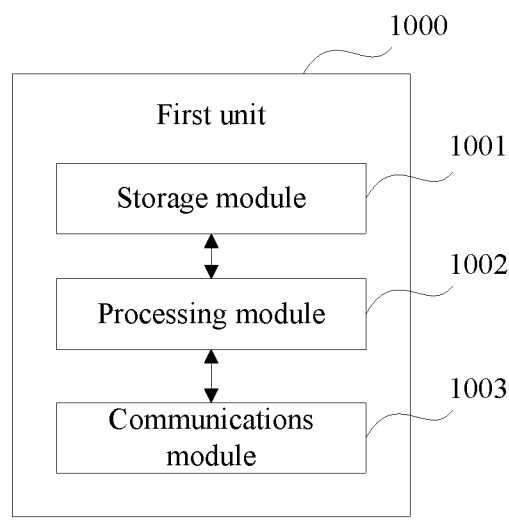
FIG. 10A is a schematic block diagram of a first unit according to an embodiment of this application.

In a case of using an integrated unit, FIG. 10A is a possible schematic block diagram of a first unit moo according to an embodiment of this application. The first unit moo includes a processing module 1002 and a communications module 1003. The processing module 1002 is configured to control and manage actions of the first unit. For example, the processing module 1002 is configured to support the first unit in performing the processes 301 and 302 in FIG. 3, the processes 402, 403, and 407 in FIG. 4, the processes 502, 503, and 507 in FIG. 5, the processes 602, 603, and 606 in FIG. 6, the processes 702 and 703 in FIG. 7, the processes 802 and 803 in FIG. 8, the processes 902 and 903 in FIG. 9, and/or other processes of the technical solutions described in this specification. The communications module 1003 is configured to support communication between the first unit and a second unit, a third unit, or an integrated unit. The first unit may further include a storage module 1001, configured to store program code and data of the first unit.

The processing module 1002 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1003 may be a communications interface, a transceiver, a transceiver circuit, or the like. The communications interface is a collective name. In specific implementation, the communications interface may include a plurality of interfaces, for example, may include an interface between the first unit and the second unit, the third unit, or the integrated unit, and/or another interface. The storage module 1001 may be a memory.

Figure 10B:
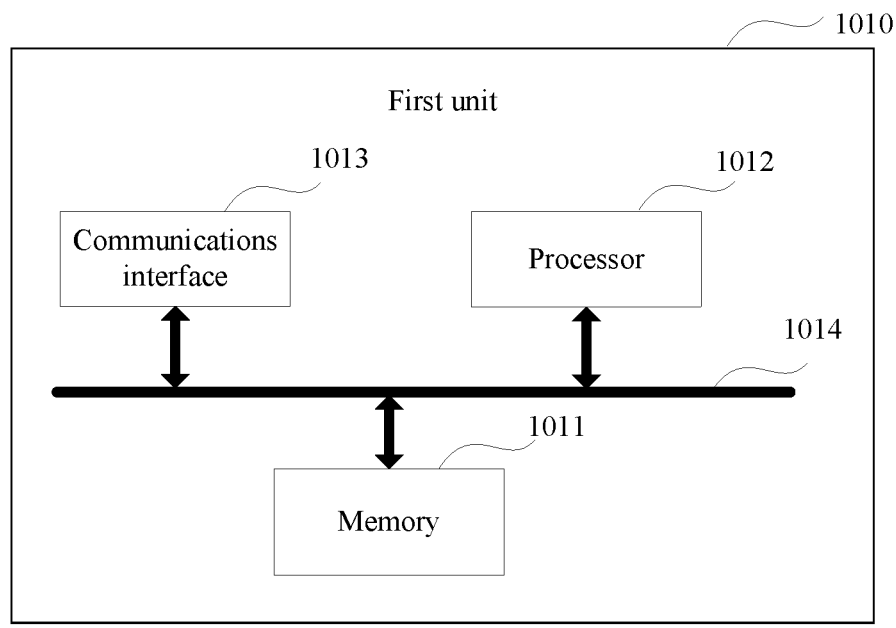
FIG. 10B is a schematic structural diagram of a first unit according to an embodiment of this application.

When the processing module 1002 is a processor, the communications module 1003 is a communications interface, and the storage module 1001 is a memory, the first unit in this embodiment of this application may be a first unit 1010 shown in FIG. 10B.

Referring to FIG. 10B, the first unit 1010 includes a processor 1012, a communications interface 1013, and a memory 1011. Optionally, the first unit 1010 may further include a bus 1014. The communications interface 1013, the processor 1012, and the memory 1011 may be connected to each other by using the bus 1014. The bus 1014 may be a peripheral component interconnect (PCI) bus, an extended industry standard architecture (EISA) bus, or the like. The bus 1014 may be classified into an address bus, a data bus, a control bus, and the like. For ease of notation, only one thick line is used to represent the bus in FIG. 10B, but this does not mean that there is only one bus or only one type of bus.

The first unit shown in FIG. 10A and FIG. 10B may be the NSOAM in FIG. 2A or FIG. 2B, or may be another unit, for example, an NSO, an NSM, an NO, an NM, or an NFVO.

Figure 11A:
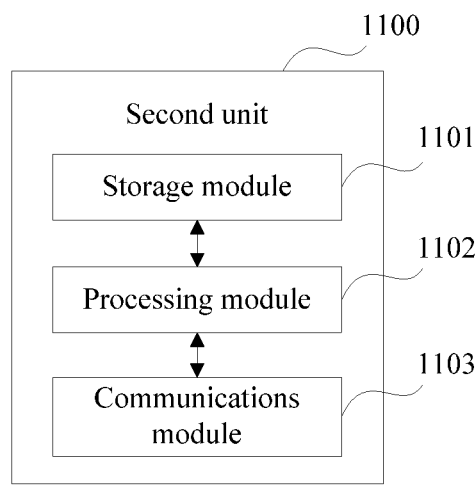
FIG. 11A is a schematic block diagram of a second unit according to an embodiment of this application.

In a case of using an integrated unit, FIG. 11A is a possible schematic block diagram of 1100 a second unit according to an embodiment of this application. The second unit 1100 includes a processing module 1102 and a communications module 1103. The processing module 1102 is configured to control and manage actions of the second unit. For example, the processing module 1102 is configured to support the second unit in performing the process 303 in FIG. 3, the process 401, the processes 404 to 406, and the processes 411 to 413 in FIG. 4, the process 501, the processes 504 to 506, and the processes 511 to 513 in FIG. 5, the processes 601, 604, and 605 in FIG. 6, and/or other processes of the technical solutions described in this specification. The communications module 1103 is configured to support communication between the second unit and a first unit or a third unit. The second unit may further include a storage module 1101, configured to store program code and data of the second unit.

The processing module 1102 may be a processor or a controller, for example, may be a CPU, a general purpose processor, a DSP, an ASIC, an FPGA or another programmable logic device, a transistor logic device, a hardware component, or any combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1103 may be a communications interface, a transceiver, a transceiver circuit, or the like. The communications interface is a collective name. In specific implementation, the communications interface may include a plurality of interfaces, for example, may include an interface between the second unit and the first unit or the third unit, and/or another interface. The storage module 1101 may be a memory.

Figure 11B:
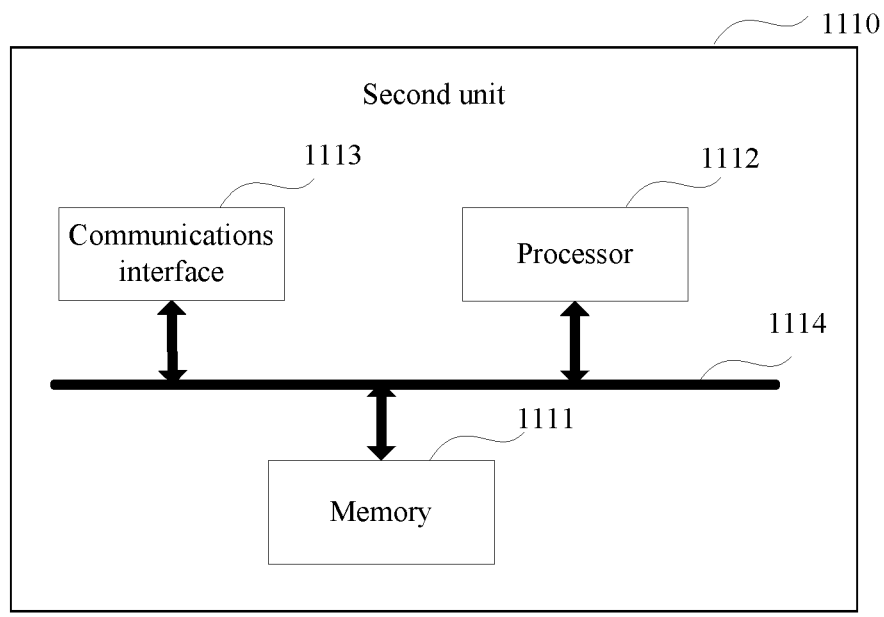
FIG. 11B is a schematic structural diagram of a second unit according to an embodiment of this application.

When the processing module 1102 is a processor, the communications module 1103 is a communications interface, and the storage module 1101 is a memory, the second unit in this embodiment of this application may be a second unit 1110 shown in FIG. 11B.

Referring to FIG. 11B, the second unit 1110 includes a processor 1112, a communications interface 1113, and a memory 1111. Optionally, the second unit 1110 may further include a bus 1114. The communications interface 1113, the processor 1112, and the memory 1111 may be connected to each other by using the bus 1114. The bus 1114 may be a PCI bus, an EISA bus, or the like. The bus 1114 may be classified into an address bus, a data bus, a control bus, and the like. For ease of notation, only one thick line is used to represent the bus in FIG. 11B, but this does not mean that there is only one bus or only one type of bus.

The second unit shown in FIG. 11A and FIG. 11B may be the NSSF or the NF-M/data center in FIG. 2A.

Figure 12A:
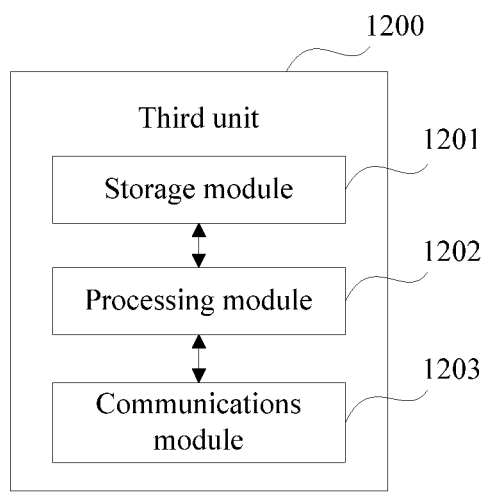
FIG. 12A is a schematic block diagram of a third unit according to an embodiment of this application.

In a case of using an integrated unit, FIG. 12A is a possible schematic block diagram of a third unit 1200 according to an embodiment of this application. The third unit 1200 includes a processing module 1202 and a communications module 1203. The processing module 1202 is configured to control and manage actions of the third unit. For example, the processing module 1202 is configured to support the third unit in performing the processes 408 to 410 and the process 414 in FIG. 4, the processes 508 to 510 and the process 514 in FIG. 5, the processes 607 and 608 in FIG. 6, and/or other processes of the technical solutions described in this specification. The communications module 1203 is configured to support communication between the third unit and a first unit or a second unit. The third unit may further include a storage module 1201, configured to store program code and data of the third unit.

The processing module 1202 may be a processor or a controller, for example, may be a CPU, a general purpose processor, a DSP, an ASIC, an FPGA or another programmable logic device, a transistor logic device, a hardware component, or any combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1203 may be a communications interface, a transceiver, a transceiver circuit, or the like. The communications interface is a collective name. In specific implementation, the communications interface may include a plurality of interfaces, for example, may include an interface between the third unit and the first unit or the second unit, and/or another interface. The storage module 1201 may be a memory.

Figure 12B:
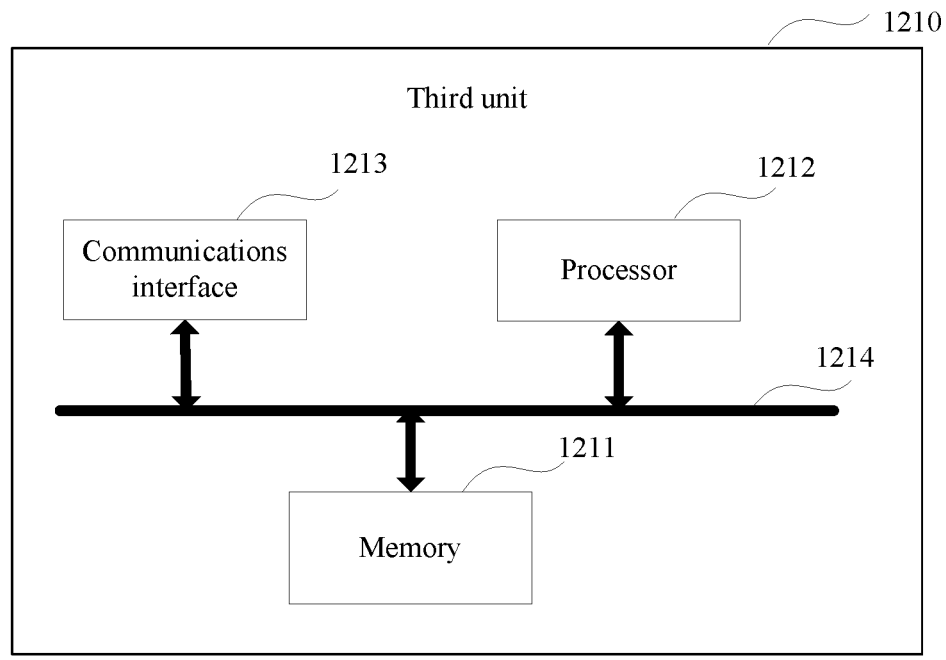
FIG. 12B is a schematic structural diagram of a third unit according to an embodiment of this application.

When the processing module 1202 is a processor, the communications module 1203 is a communications interface, and the storage module 1201 is a memory, the third unit in this embodiment of this application may be a third unit 1210 shown in FIG. 12B.

Referring to FIG. 12B, the third unit 1210 includes a processor 1212, a communications interface 1213, and a memory 1211. Optionally, the third unit 1210 may further include a bus 1214. The communications interface 1213, the processor 1212, and the memory 1211 may be connected to each other by using the bus 1214. The bus 1214 may be a PCI bus, an EISA bus, or the like. The bus 1214 may be classified into an address bus, a data bus, a control bus, and the like. For ease of notation, only one thick line is used to represent the bus in FIG. 12B, but this does not mean that there is only one bus or only one type of bus.

The third unit shown in FIG. 12A and FIG. 12B may be the common NF/NF repository or the NF-M/data center in FIG. 2A.

Figure 13A:
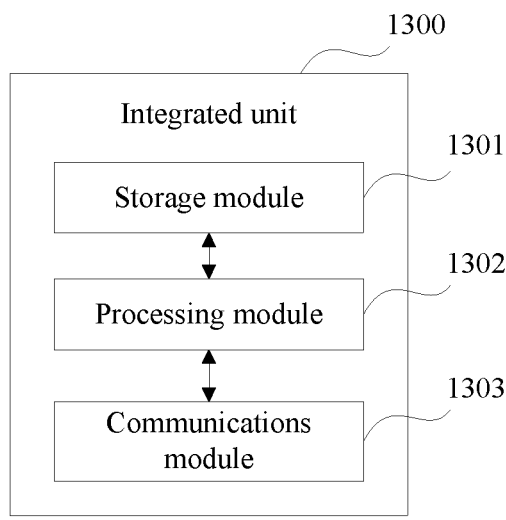
FIG. 13A is a schematic block diagram of an integrated unit according to an embodiment of this application.

In a case of using an integrated unit, FIG. 13A is a possible schematic block diagram of an integrated unit 1300 according to an embodiment of this application. The integrated unit 1300 includes a processing module 1302 and a communications module 1303. The processing module 1302 is configured to control and manage actions of the integrated unit. For example, the processing module 1302 is configured to support the integrated unit in performing the process 303 in FIG. 3, the process 401, the processes 404 to 406, the processes 408 to 412, and the process 414 in FIG. 4, the process 501, the processes 504 to 506, the processes 508 to 512, and the process 514 in FIG. 5, the processes 601, 604, 605, 607, and 608 in FIG. 6, the process 701 and the processes 704 to 709 in FIG. 7, the process 801 and the processes 804 to 809 in FIG. 8, the processes 901, 904, and 905 in FIG. 9, and/or other processes of the technical solutions described in this specification. The communications module 1303 is configured to support communication between the integrated unit and a first unit. The integrated unit may further include a storage module 1301, configured to store program code and data of the integrated unit.

The processing module 1302 may be a processor or a controller, for example, may be a CPU, a general purpose processor, a DSP, an ASIC, an FPGA or another programmable logic device, a transistor logic device, a hardware component, or any combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1303 may be a communications interface, a transceiver, a transceiver circuit, or the like. The communications interface is a collective name. In specific implementation, the communications interface may include a plurality of interfaces, for example, may include an interface between the integrated unit and the first unit, and/or another interface. The storage module 1301 may be a memory.

Figure 13B:
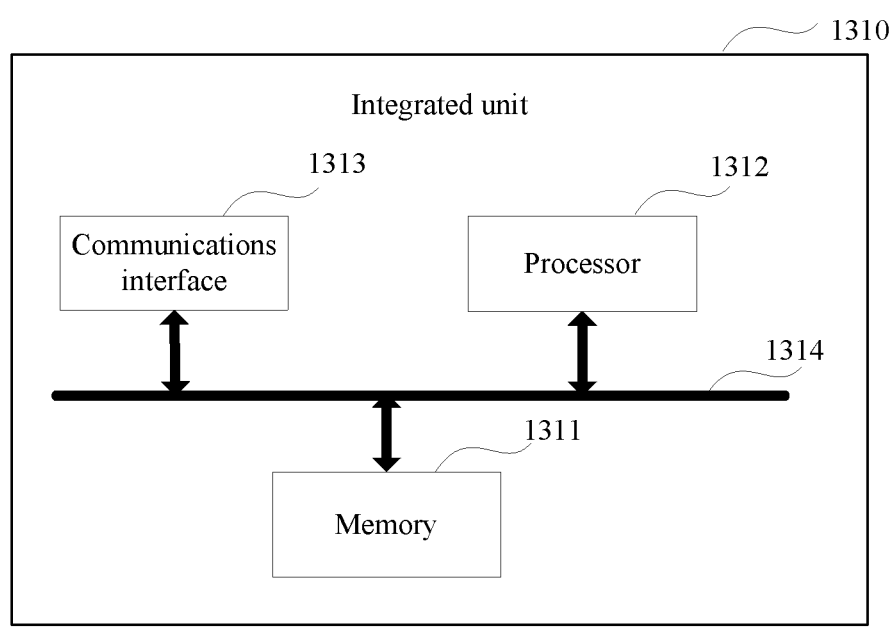
FIG. 13B is a schematic structural diagram of an integrated unit according to an embodiment of this application.

When the processing module 1302 is a processor, the communications module 1303 is a communications interface, and the storage module 1301 is a memory, the integrated unit in this embodiment of this application may be an integrated unit 1310 shown in FIG. 13B.

Referring to FIG. 13B, the integrated unit 1310 includes a processor 1312, a communications interface 1313, and a memory 1311. Optionally, the integrated unit 1310 may further include a bus 1314. The communications interface 1313, the processor 1312, and the memory 1311 may be connected to each other by using the bus 1314. The bus 1314 may be a PCI bus, an EISA bus, or the like. The bus 1314 may be classified into an address bus, a data bus, a control bus, and the like. For ease of notation, only one thick line is used to represent the bus in FIG. 13B, but this does not mean that there is only one bus or only one type of bus.

The integrated unit shown in FIG. 13A and FIG. 13B may be the common NF/NSC or the NF-M/data center in FIG. 2B.

Methods or algorithm steps described in combination with the content disclosed in the embodiments of this application may be implemented by hardware, or may be implemented in a manner of executing a software instruction by a processor. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. An example storage medium is coupled to a processor, so that the processor can read information from the storage medium or write information into the storage medium. Certainly, the storage medium may be a component of the processor. The processor and the storage medium may be located in the ASIC. In addition, the ASIC may be located in the first unit, the second unit, the third unit, or the integrated unit. Certainly, the processor and the storage medium may alternatively exist in the first unit, the second unit, the third unit, or the integrated unit as discrete components.

A person skilled in the art should be aware that in the foregoing one or more examples, functions described in the embodiments of this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on technical solutions of the embodiments of this application shall fall within the protection scope of the embodiments of this application.

What is claimed is:

1. A method, comprising:
   creating or updating, by a first device, a network slice instance; and
   sending, by the first device, a first message to a second device, wherein the first message carries first network slice instance information, the first network slice instance information is first information about the network slice instance, and the first network slice instance information comprises:
   an identifier of the network slice instance;
   a status of the network slice instance;
   information about a network function instance required by the network slice instance, the information about the network function instance comprising an identifier of the network function instance and a status of the network function instance;
   information about a tenant supported by the network slice instance; and
   information about a service provided by the network slice instance.

2. The method according to claim 1, wherein the first message is:
   an addition notification message of the network slice instance;
   a configuration message of the network slice instance;
   an update notification message of the network slice instance; or
   a reconfiguration message of the network slice instance.

3. The method according to claim 2, wherein:
   the first message is the addition notification message of the network slice instance or the configuration message of the network slice instance, the network slice instance is a created network slice instance, and the first network slice instance information further comprises a type of the created network slice instance; or
   the first message is the update notification message of the network slice instance or the reconfiguration message of the network slice instance and the network slice instance is an updated network slice instance.

4. The method according to claim 1, wherein the information about the tenant, the information about the service, or both, are used to allocate a target network slice instance meeting a service request to a terminal.

5. The method according to claim 1, further comprising:
   sending, by the first device, a second message to a third device, wherein the second message carries second network slice instance information, and the second network slice instance information is second information about the network slice instance; and
wherein the second network slice instance information comprises the identifier of the network slice instance; and
wherein:
the network slice instance is a created network slice instance, and the second network slice instance information further comprises: a status of the created network slice instance or information about a network function instance required by the created network slice instance, wherein the information about the network function instance comprises: an identifier of the network function instance, a status of the network function instance, or a type of the network function instance; or
the network slice instance is an updated network slice instance, and the second network slice instance information further comprises: a status of the updated network slice instance or the information about the network function instance required by the updated network slice instance, wherein the information about the network function instance comprises: an identifier of an updated network function instance, a status of an updated network function instance, an identifier of a newly added network function instance, or an identifier of a deleted network function instance.

6. The method according to claim 1, wherein before sending, by the first device, the first message to the second device, the method further comprises:
receiving, by the first device, a subscription request from the second device, wherein the subscription request is used to subscribe to the first network slice instance information; or
receiving, by the first device, a query request from the second device, wherein the query request is used to query the first network slice instance information.

7. The method according to claim 1, wherein the first device is a network slice orchestration and management device, and the second device is a network slice selection function device or a network function manager device.

8. A method, comprising:
receiving, by a second device, a first message from a first device, wherein the first message carries network slice instance information, the network slice instance information is information about a network slice instance that is created or updated by the first device, and the network slice instance information comprises:
an identifier of the network slice instance;
a status of the network slice instance;
information about a network function instance required by the network slice instance, the information about the network function instance comprising an identifier of the network function instance and a status of the network function instance;
information about a tenant supported by the network slice instance; and
information about a service provided by the network slice instance; and
storing or configuring, by the second device, the network slice instance information.

9. A first device, comprising:
a non-transitory memory, configured to store computer-executable program code; and
at least one processor coupled to the non-transitory memory, wherein the computer-executable program code comprises instructions, and when the at least one processor executes the instructions, the instructions cause the first device to:
create or update a network slice instance; and
send a first message to a second device, wherein the first message carries first network slice instance information, the first network slice instance information is first information about the network slice instance, and the first network slice instance information comprises:
an identifier of the network slice instance:
a status of the network slice instance;
information about a network function instance required by the network slice instance, the information about the network function instance comprising an identifier of the network function instance and a status of the network function instance;
information about a tenant supported by the network slice instance; and
information about a service provided by the network slice instance.

10. The first device according to claim 9, wherein the first message is:
an addition notification message of the network slice instance;
a configuration message of the network slice instance;
an update notification message of the network slice instance; or
a reconfiguration message of the network slice instance.

11. The first device according to claim 10, wherein:
the first message is the addition notification message of the network slice instance or the configuration message of the network slice instance, and the first network slice instance information further comprises a type of the network slice instance; or
the first message is the update notification message of the network slice instance or the reconfiguration message of the network slice instance and the network slice instance is the updated network slice instance.

12. The first device according to claim 9, wherein the information about the tenant, the information about the service, or both, are used to allocate a target network slice instance meeting a service request to a terminal.

13. The first device according to claim 9, wherein the instructions further cause the first device to:
send a second message to a third device, wherein the second message carries second network slice instance information, and the second network slice instance information is second information about the network slice instance;
wherein the second network slice instance information comprises the identifier of the network slice instance; and
wherein:
the network slice instance is a created network slice instance, and the second network slice instance information further comprises: a status of the created network slice instance or information about a network function instance required by the created network slice instance, wherein the information about the network function instance comprises: the identifier of the network function instance, a status of the network function instance, or a type of the network function instance; or
the network slice instance is an updated network slice instance, and the second network slice instance information further comprises: a status of the updated network slice instance or information about a network function instance required by the updated network slice instance, wherein the information about the network function instance comprises: an identifier of an updated network function instance, a status of an updated network function instance, an identifier of a newly added network function instance, or an identifier of a deleted network function instance.

14. The first device according to claim 9, wherein the instructions further cause the first device to:
receive a subscription request from the second device, wherein the subscription request is used to subscribe to the first network slice instance information; or
receive a query request from the second device, wherein the query request is used to query the first network slice instance information.

15. The first device according to claim 9, wherein the first device is a network slice orchestration and management device, and the second device is a network slice selection function device or a network function manager device.

16. A second device, comprising:
a non-transitory memory, configured to store computer-executable program code; and
at least one processor coupled to the non-transitory memory, wherein the computer-executable program code comprises instructions, and when the at least one processor executes the instructions, the instructions cause the second device to:
receive a first message from a first device, wherein the first message carries network slice instance information, the network slice instance information is information about a network slice instance that is updated or created by the first device, and the network slice instance information comprises:
an identifier of the network slice instance;
a status of the network slice instance;
information about a network function instance required by the network slice instance, the information about the network function instance comprising an identifier of the network function instance and a status of the network function instance;
information about a tenant supported by the network slice instance; and
information about a service provided by the network slice instance; and
store or configure the network slice instance information.

17. The second device according to claim 16, wherein the first message is:
an addition notification message of the network slice instance;
a configuration message of the network slice instance;
an update notification message of the network slice instance; or
a reconfiguration message of the network slice instance.

18. The second device according to claim 17, wherein:
the first message is the addition notification message of the network slice instance or the configuration message of the network slice instance, the network slice instance is a created network slice instance, and the network slice instance information further comprises a type of the created network slice instance; or
the first message is the update notification message of the network slice instance or the reconfiguration message of the network slice instance and the network slice instance is an updated network slice instance.

19. The second device according to claim 18, wherein the instructions further cause the second device to:
receive a service request from a terminal; and
allocate a target network slice instance meeting the service request to the terminal based on the network slice instance information.

20. The second device according to claim 19, wherein the network slice instance information comprises the information about the tenant or the information about the service, and the instructions further cause the second device to:
allocate the target network slice instance to the terminal based on the information about the tenant or the information about the service.

* * * * *